(12) United States Patent
Landry, Jr.

(10) Patent No.: US 6,523,817 B1
(45) Date of Patent: Feb. 25, 2003

(54) INTERLOCKING VEHICLE BODY MOUNT

(75) Inventor: Joseph Raymond Landry, Jr., Douchequet, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/914,891

(22) PCT Filed: Apr. 23, 1999

(86) PCT No.: PCT/US99/08931

§ 371 (c)(1),
(2), (4) Date: Sep. 4, 2001

(87) PCT Pub. No.: WO00/64691

PCT Pub. Date: Nov. 2, 2000

(51) Int. Cl.[7] .................................................. F16F 7/00
(52) U.S. Cl. ................ 267/141.4; 267/141.2; 296/35.1
(58) Field of Search ............................ 267/141.2, 141.4, 267/141.5, 293, 294; 296/35.1; 403/224, 227, 228; 248/632–638

(56) References Cited

U.S. PATENT DOCUMENTS

| | | | |
|---|---|---|---|
| 2,838,339 A | 10/1958 | Schaldenbrand | 296/35 |
| 3,479,081 A | 11/1969 | Schaaf | 296/35 |
| 3,622,194 A | 11/1971 | Bryk | 296/35 R |
| 3,809,427 A | 5/1974 | Bennett | 296/35 R |
| 4,720,075 A | 1/1988 | Peterson et al. | 248/635 |
| 4,783,039 A | 11/1988 | Peterson et al. | 248/635 |
| 4,921,203 A | 5/1990 | Peterson et al. | 248/267 |
| 5,170,985 A | 12/1992 | Kilworth et al. | 248/635 |
| 5,178,433 A | 1/1993 | Wagner | 296/35.1 |
| 5,570,867 A | 11/1996 | Norkus | 248/635 |
| 5,765,819 A | 6/1998 | Hummel | 267/153 |
| 5,799,930 A | 9/1998 | Willett | 267/141.4 |

FOREIGN PATENT DOCUMENTS

DK 2054998 7/1971

*Primary Examiner*—Pam Rodriguez
(74) *Attorney, Agent, or Firm*—Nancy T. Krawczyk

(57) ABSTRACT

A vehicle body mount comprised of a lower rebound mount and an upper load mount provides a method to fasten the rebound mount to the load mount in preparation for accommodation of a vehicle frame and vehicle body which may be radially eccentric mismatched. While continually maintaining the interlock function, the integral rebound mount and flexible interlock feature allows radial float of the rebound mount relative to the load mount, until the securing bolt seeks, engages, and is aligned with the body mounted nut, during assembly of the body to the frame. The rebound mount is defined by an extending interlock which is expandable at its outermost portion in order to engage the central opening of the upper load mount.

10 Claims, 4 Drawing Sheets

INTERLOCKING VEHICLE BODY MOUNT

TECHNICAL FIELD

The present invention relates to body mounts utilized in mounting a vehicle body to a vehicle frame or chassis to assist in eliminating the transfer of vibrations from the frame to the vehicle body.

BACKGROUND ART

In the manufacturing of vehicles, it is known to mount a vehicle body to the vehicle frame in such a manner to reduce the transfer of vibration from the frame to the body. Were the vibration not reduced, the vehicle passengers would experience a high level of noise and road feel to the vibration transfer. The desired reduction is accomplished by securing the body to the flame utilizing resilient body mounts.

Body mounts typically comprise a load mount, which, when assembled, is located between the frame and vehicle body and a rebound mount which is mounted underneath the vehicle frame. A few typical body mounts are illustrated in U.S. Pat. Nos. 2,838,339, 3,479,081, and 3,809,427. U.S. Pat. Nos. 2,838,339 and 3,809,427 disclose two-part mounts, while 3,479,081 discloses a unitary mount for when one end of the mount is inaccessible.

To reduce assembly time of the vehicle, modern manufacturing includes the step of preassembling or premounting the body mount on the frame. With premounted body mounts, the assembly line workers need only insert the fastening means into the vehicle body and the mount.

Various methods have been employed to accomplish the desired preassembly of the body mount. U.S. Pat. No. 3,622,194 discloses a body mount with "snap action" connectors to hold the body mount in an interlocked, preassembly position. U.S. Pat. No. 4,720,075 discloses providing a tabbed washer inside of an alignment tube wherein, when the flared end of a thimble tube is inserted into the alignment tube, the tabs lock the thimble tube into a preassembly position. U.S. Pat. No. 5,170,985 discloses providing the tabbed washer integral with the thimble tube which locks with the narrowed width of the alignment tube to form a preassembly of the body mount.

The tab preassembly means of the above referenced patents provide for sufficient holding of the two components of the body mount; however, manufacturing and assembly of the separate components adds substantially to the cost of the mount. Additionally, the tabs can readily become damaged during manufacturing, resulting in substantial product and time loss during manufacturing. Due to the required corresponding configuration and sizing of the thimble and spacer tubes the mounts of the prior art are not applicable for preassemblies which must permit a relatively high degree of radial float between the thimble and spacer tubes due to potential misalignment of the apertures of the frame and vehicle body.

Furthermore, with many automotive manufacturers seeking to maximum efficiency with preassembled components, it may be required that the preassembled vehicle components are transported a substantial distance from the preassembly location to the final assembly location. Thus the preassembly must be very robust, and not come apart readily during transportation.

The present invention provides a body mount that is simpler to manufacture and assemble, resulting in a more cost efficient product. The inventive body mount has fewer parts that can potentially be damaged during manufacturing, assembly, and transportation, resulting in less time and material being wasted during manufacturing. The body mount permits a high degree of radial misalignment of the apertures of the frame and vehicle body. Additionally, the inventive body mount is robust, inexpensive to produce, and requires no special tools or awkward procedures to either engage, disengage, or reengage.

SUMMARY OF THE INVENTION

The present invention provides means to fasten a rebound mount to a load mount, in preparation for accommodation of a frame and load mount radially eccentric mismatch to the body fastener, most commonly a nut. While continually maintaining the interlock function, the integral rebound mount and flexible interlock feature allows radial float of the rebound mount, until the securing bolt seeks, engages, and is aligned with the body mounted nut, during assembly of the body to the frame.

A first aspect of the invention is a vehicle body mount comprising an upper load mount and a lower rebound mount. The load mount has an extending central opening with a shoulder portion. The rebound mount has a hollow extending interlock. At least the upper portion of the hollow extending interlock is elastically deformable. The upper portion of the interlock, when in a relaxed state, has a maximum dimension $D_F$ less than the corresponding dimensions $D_O$, $D_I$ of the extending central opening. The upper portion is capable of expanding to a maximum dimension for retention of the rebound mount in the load mount A further aspect of the invention is a vehicle body mount comprising an upper load mount and a lower rebound mount, the rebound being definable by a hollow extending interlock. When the upper portion of the interlock is elastically deformed, the maximum dimension of the hollow extending interlock is greater than the minimum dimension $D_I$ of the extending central opening. A further aspect is an interlock dimensioned so that when the upper portion is elastically deformed, the maximum dimension is also less than or equal to the maximum dimension $D_O$ of the extending central opening.

A further aspect of the invention is a vehicle body mount wherein the bound mount has a plurally of vanes spaced about the upper portion of a hollow extending interlock. The rebound mount preferably has three to eight vanes.

A further aspect of the invention employs a rebound mount where the upper portion of an extending interlock is defined by a plurality of vanes, the vanes being comprised of multiple face surfaces. The face, surfaces are the radially outer faces of the vanes and at least one of the face surfaces contacts the extending central opening of the load mount when the upper portion of the hollow extending interlock is expanded.

A further aspect of the invention is a vehicle body mount comprising an actuating means that is inserted into the hollow interlock after the rebound mount is inserted into the load mount. The actuating means may be either a bolt which may or may not be used for the final securing step of attaching the vehicle frame to the vehicle body or an actuating tube.

BRIEF DESCRIPTION OF DRAWINGS

The invention will be described by way of example and with reference to the accompanying drawings in which.

DETAILED DESCRIPTION OF THE INVENTION

Figure 1:
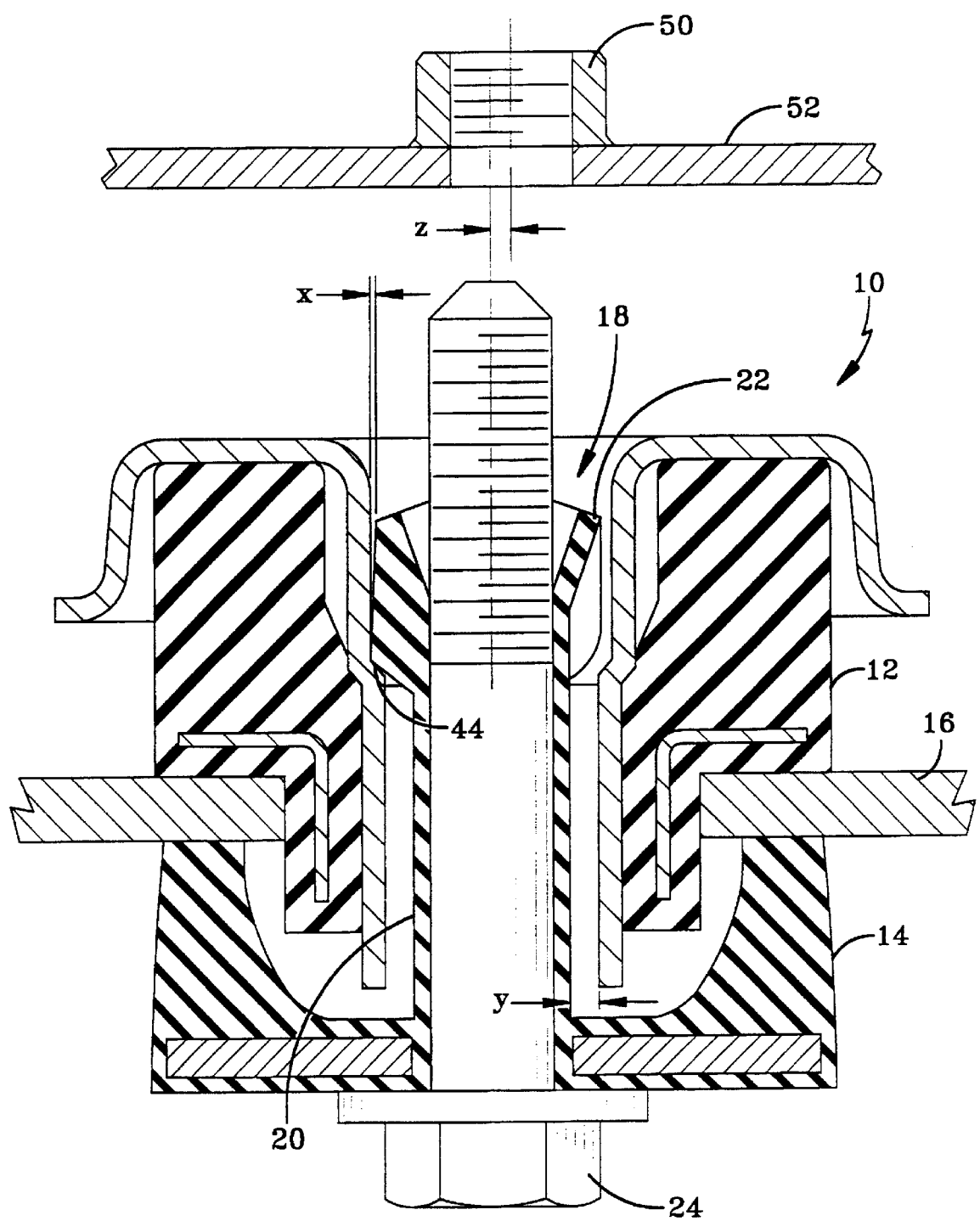
FIG. 1 is a cross-sectional view of the preassembled vehicle body mount.

FIG. 1 illustrates a body mount 10 in a temporary interlocking configuration. The configuration permits the body mount 10 to maintain a temporary connection of the upper load mount 12 and a lower rebound mount 14 on a vehicle frame 16. Briefly, the load mount has a central extending opening 18 into which the extending interlock 20 of the rebound mount 14 is inserted. The extending interlock 20 of the rebound mount 14 has a plurality of expansion vanes 22. When any actuating means, such as the illustrated frame-to-body bolt 24 or an actuator tube 54 (see FIG. 5). is inserted into an elevation of the vanes 22, the upper portion of the extending interlock 20 expands radially outward, causing the vanes 22 to interact with the opening 18. This expansion maintains the body mount 10 in the illustrated interlocking configuration.

The pre-interlock insertion of the rebound mount 14 into the load mount 12 requires only a minimal force that is equal to the weight of the rebound mount 14. For a typical sized mount 10, this insertion force is not more than 5 lbs$_f$. Once the vanes 22 are expanded, a retention force greater than ten times the weight of either the load mount 12 or the rebound mount 14 is generated.

Figure 2:
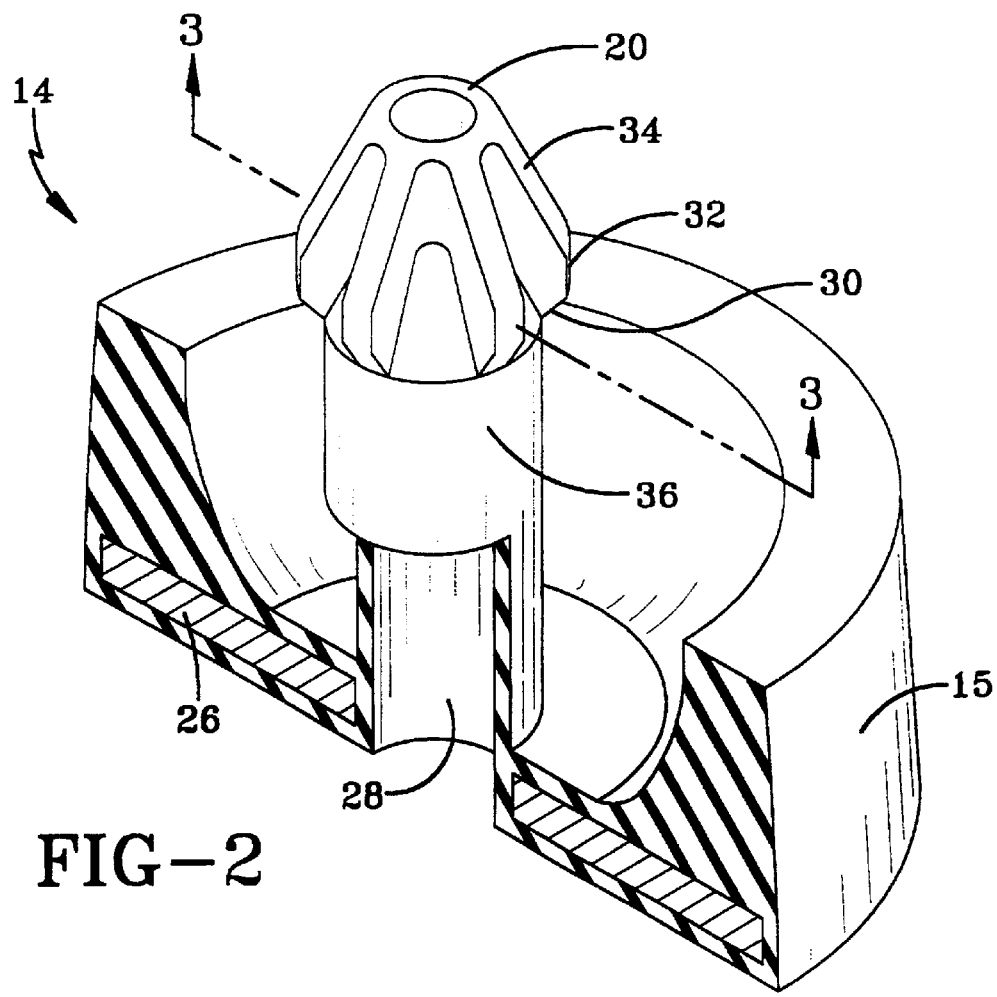
FIG. 2 is a perspective view of the rebound mount.
Figure 3:
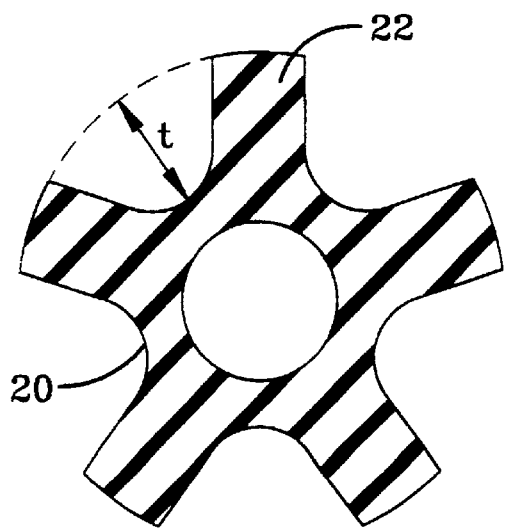
FIG. 3 is a cross-sectional view of the rebound mount along line 3—3.

The rebound mount 14, seen illustrated in FIGS. 2 and 3, is predominately a resilient element which is capable of elastically deforming. Extending along the base of the mount 14 is a reinforcing rigid plate 26. The reinforcing plate 26, in its primary embodiment, has a circular configuration with a central opening. Preferably, the plate 26 is a rigid material, for example, steel plate. The lower portion of the extending interlock 20 may also be formed from a rigid material, so long as the upper portion of the interlock 20, including the vanes 22, are formed of a resilient material which is capable of.elastically deforming.

Figure 4:
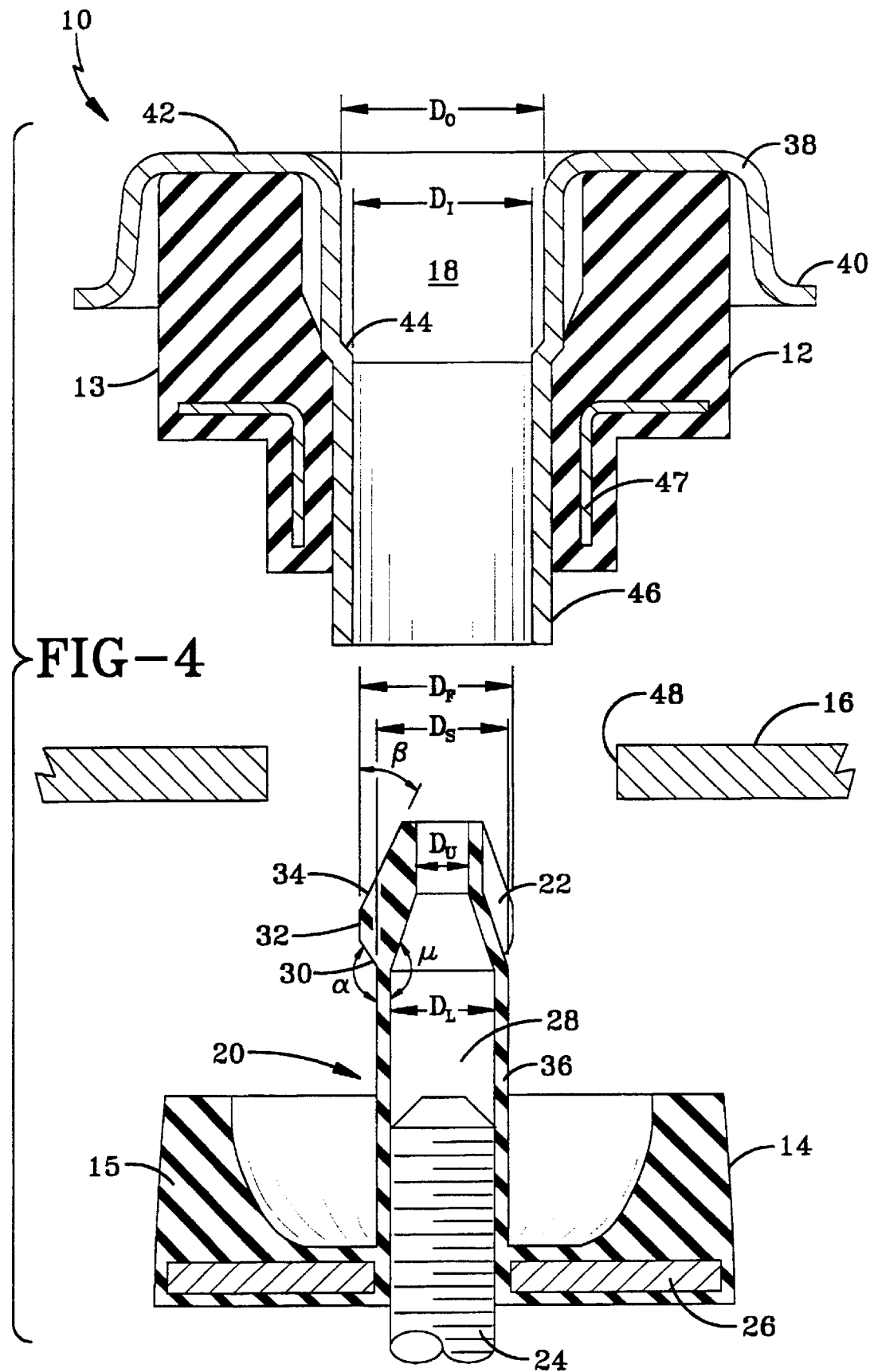
FIG. 4 is a cross-sectional view of the partially assembled body mount.

The extending interlock 20 extends from the central portion of the rebound mount 14. The extending interlock 20 has a hollow central portion 28 through which the actuating means, herein, the bolt 24, passes. The top portion of the extending interlock 20 is defined by the plurality of expansion vanes 22. The vanes 22 are defined by three surface faces prior to preassembly, as seen in FIGS. 2 and 4. The first face 30 is inclined away from the main portion 36 of the extending interlock 20, with the second face 32 extending from the first face 30. The first face 30 has an inclination angle relative to the main portion 36 of the extending interlock 20. The second face 32, in its primary embodiment, is nominally parallel to the main shaft portion 36. The third face 34 is inclined away from the second face 32 at an angle β. The first face inclination angle is within the range of 90° to 150°, with a preferred range of 120° to 150°; the third face inclination angle B is within the range of 15° to 40°, with a preferred range of 20° to 30°.

The extending interlock 20 is illustrated with five expansion vanes 22; however, the number of vanes 22 may vary from a minimum of three and may even have more than eight vanes. The primary limitations on the number of vanes 22 are the resiliency of the material which forms the upper portion of the extending interlock 20 and the ability of a minimum number of vanes 22 to interact with the extending opening to maintain the preassembled position. Prior to expansion of the vanes 22, the greatest dimension of the top portion of the extending interlock is $D_F$.

The hollow central portion 28 of the extending interlock 20 has a varying internal diameter, see FIG. 4. The lower interlock portion has a fixed internal diameter, $D_L$. The internal diameter decreases coincident with the beginning of the inclination of the first face 30 of the vanes 22. The diameter decrease terminates above the axial location of the juncture of the second 32 and third 34 vane faces. The diameter decrease results in an inclination angle $\mu$ relative to the lower interlock portion. The upper internal diameter $D_U$ of the extending interlock 20 is approximately 40% to 70% of $D_L$. The vanes 22 have a radial thickness t, see FIG. 3. that is variable and quantified as a result of the result of the quantitative descriptions of $D_F$, $D_U$, $\mu$, and $\beta$.

The load mount 12, illustrated in FIG. 4, is a composite of rigid and resilient portions. The rigid portion 38 has a cap shaped portion beginning at the flange 40, which extends axially and then radially to form the top surface 42 of the mount 12. The rigid portion 38 then extends into the load rubber 13. forming the central extending opening 18. As the opening 18 extends through load mount 12, the diameter of the opening 18 decreases. The diameter decrease occurs over a limited length, forming a shoulder 44. The lower portion 46 of the central opening 18 extends past the load rubber 13. A rigid ring 47, as illustrated may reinforce the load rubber 13. Both the ring 47 and the rigid portion 38 are preferably formed of a rid material, for example, steel. The outer portion of the opening 18 has a diameter $D_O$, and the inner portion has a diameter $D_I$. The inner diameter $D_I$ is 80–95% of $D_O$.

Figure 5:
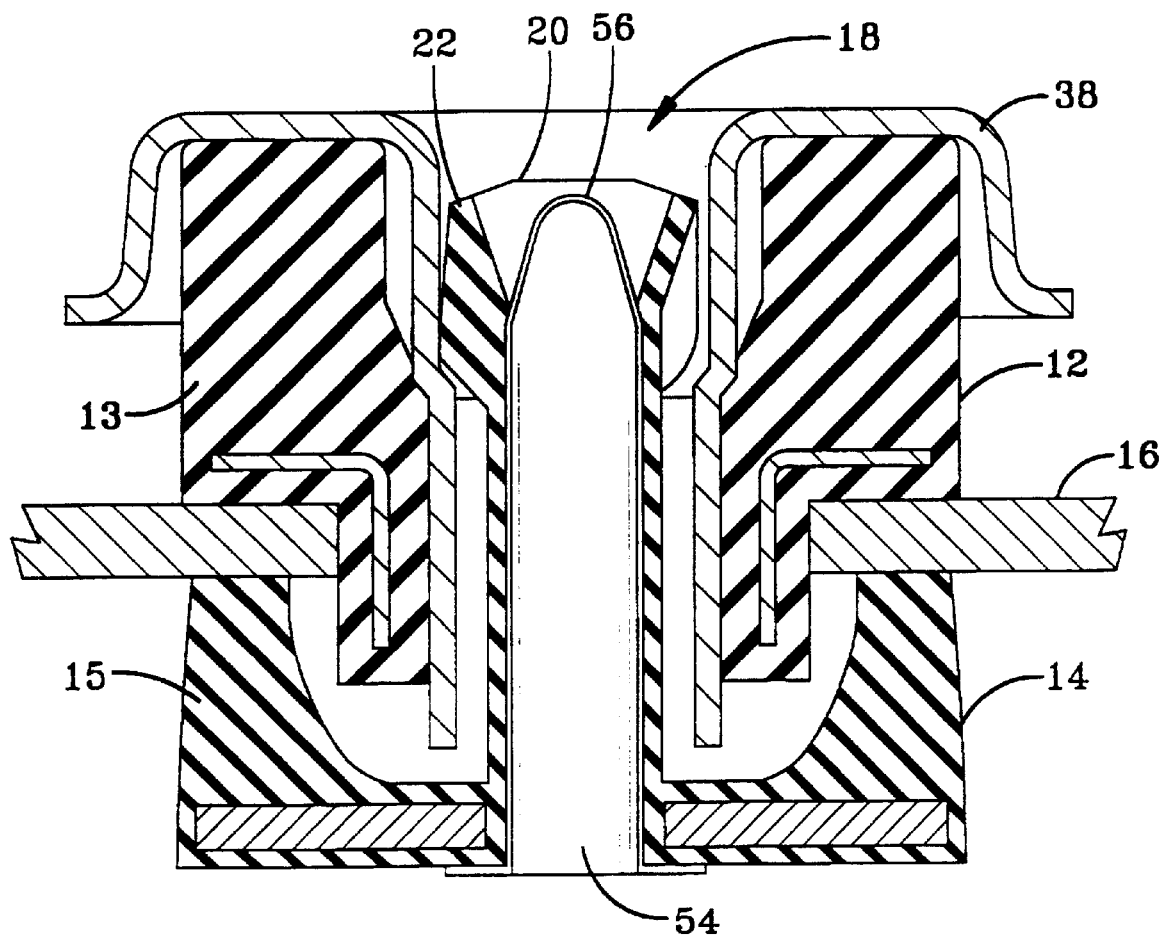
FIG. 5 is a cross-sectional view of an alternative preassembly of the body mount.

FIG. 4 illustrates the body mount 10 prior to preassembly. The load mount 12 is located over the aperture 48 of the vehicle frame 16, with the lower portion 46 of the central opening 18 aligned to extend into the aperture 48. The rebound mount 14 is brought into place below the vehicle frame 16 and aligned with the central aperture 48 and the lower portion 46 of the central opening 18. The load and rebound mounts 12, 14 are brought towards one another until the load rubber 13 and the rebound rubber 15 of the respective mounts 12, 14 contact the vehicle frame 16, and the end of the lower portion 46 is at a performance defined distance from the central portion of the rebound mount 14, as seen in FIGS. 1 and 5. At any time after the vanes 22 of the rebound mount 14 have axially extended above the shoulder 44 of the central opening 18, the bolt 24 may be pushed into the opening 28 to force the radial expansion of the vanes 22.

Since the bolt 24 has a diameter greater than the decreasing diameter portion of the interlock 20 and the upper shaft portion diameter $D_U$, and the interlock. 20 is formed of a resilient material, the upper portion of the interlock 20, and the vanes 22, expand radially outward, see FIG. 1. At least one of the surface faces 30, 32, 34 that define the vane 22 contacts the wall of the opening 18. The final outermost diameter of the vanes is greater than inner diameter $D_I$ of the central opening 18, but less than, or equal to, the outer diameter $D_O$ of the opening 18, the difference in diameters may be defined as the measurement x. This, and the radial deformability of the vanes 22, creates a flex-float amount y. The flex-float amount y is also the difference between the shaft diameter $D_S$ and the inner diameter $D_I$. The flex-float amount y permits the rebound mount 14 and fastener 24 to be able to move laterally relative to the rebound mount 12 and the chassis frame 16. The flex-float amount y allows the rebound mount 14 and the fastener 24 to be realigned to the fixed, or floating, body fastener 50.

The misalignment, z, of the frame aperture 48 to the body fastener 50 is a function of the tolerances associated with each independent frame or body subassembly, and most commonly may add up to 3 or more millimeters in radial misalignment, at any of up to 10 specific locations required to attach the vehicle body 52 to the vehicle frame 16. When the fastener 24 is driven upward into the rebound mount 14, the fastener 24 passes through the extending interlock 20 of the rebound mount 14 and seeks the offset body fastener 50. The flexibility of the vanes 22 allow for minimal side load on the fastener 24.

FIG. 5 illustrates the assembled mount employing an alternate method of preassembly for the interlocking mount 10. Instead of using the bolt 24 to expand the vanes 22, a temporary actuator tube 54 is employed. The actuator tube 54 has a diameter substantially equivalent to the internal shaft diameter $D_L$. The tube 54 is illustrated with a tapering tip 56 for the purpose of providing a smooth interference between the tube 54 and the extending interlock 20. The tube 54 may have a height greater than the extending interlock 20, longer than the illustrated length. The temporary tube 54 is used in the same manner as the bolt 24, except that prior to final assembly of the vehicle body 52 to the vehicle frame 16, the bolt 24 is driven into the tube 54 and penetrates the frangible tube tip 56 prior to the bolt 24 finding the offset body fastener 50. As an alternative, the tube 54 may be removed prior to insertion of the bolt 24. The tube 54 is made of a thin material containing highly frangible serrations or notches that fracture readily upon application of: a small amount of upward force from the fastener, most commonly not exceeding 10 $lbs_f$.

While certain representative embodiments and details have been shown for the purpose of illustrating the invention, it will be apparent to those skilled in this art that various changes and modifications may be made therein without departing from the spirit or scope of the invention. It is, therefore, to be understood that changes can be made in the particular embodiments described which would be within the fully intended scope of the invention as defined by the following appended claims.

What is claimed is:

1. A vehicle body mount (10), the body mount comprising an upper load mount (12) and a lower rebound mount (14), wherein the load mount (12) has an extending central opening (18), the central opening (18) having a shoulder portion (44), and the rebound mount (14) has a hollow extending interlock (20), the hollow extending interlock (20) having an upper portion and a lower portion, wherein the upper portion of the hollow extending interlock (20) is elastically deformable and when in a relaxed state has a maximum dimension ($D_F$) less than the corresponding minimum and maximum dimensions($D_O$, $D_I$) of the extending central opening (18), and when in an expanded state, having a maximum dimension that maintains retention of the rebound mount (14) in the load mount (12).

2. A vehicle body mount (10) in accordance with claim 1 wherein the maximum dimension of the hollow extending interlock (20) when in an expanded state is greater than the minimum dimension($D_I$) of the extending central opening (18).

3. A vehicle body mount (10) in accordance with claim 2 wherein the maximum dimension of the hollow extending interlock (20) when in an expanded state is equal to or less than the maximum dimension($D_O$)of the extending central opening (18).

4. A vehicle body mount (10) in accordance with claim 1 wherein the rebound mount (14) has a plurality of vanes (22) spaced about the upper portion of the hollow extending interlock (20).

5. A vehicle body mount (10) in accordance with claim 4 wherein the rebound mount (14) has at least three vanes (22).

6. A vehicle body mount (10) in accordance with claim 4 wherein each vane is defined by multiple face surfaces (30, 32, 34) wherein at least one of the face surfaces contacts the extending central opening (18) when the upper portion of the hollow extending interlock (20) is expanded.

7. A vehicle body mount (10) in accordance with claim 1 wherein the mount (10) further comprises an actuating means (24 or 54) for inserting into the hollow interlock (20) after the rebound mount (14) is inserted into the load mount (12).

8. A vehicle body mount (10) in accordance with claim 7 wherein the actuating means is an actuator tube (54).

9. A vehicle body mount (10) in accordance with claim 1 wherein the lower portion of the hollow extending interlock (20) has a dimension ($D_S$) less than the corresponding dimensions ($D_I$) of the extending central opening (18).

10. A vehicle body mount (10) in accordance with claim 1 wherein a portion of the inside of the upper portion of the hollow extending interlock (20) is inclined at an angle ($\mu$) relative to the lower interlock portion.

* * * * *